(12) United States Patent
Kotani et al.

(10) Patent No.: US 11,735,406 B2
(45) Date of Patent: *Aug. 22, 2023

(54) SAMPLE SUPPORT (71) Applicant: HAMAMATSU PHOTONICS K.K., Hamamatsu (JP)

(72) Inventors: Masahiro Kotani, Hamamatsu (JP); Takayuki Ohmura, Hamamatsu (JP); Takamasa Ikeda, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 32 days.

This patent is subject to a terminal disclaimer.

(21) Appl. No.: 17/549,113

(22) Filed: Dec. 13, 2021

(65) Prior Publication Data

US 2022/0102126 A1 Mar. 31, 2022

Related U.S. Application Data

(63) Continuation of application No. 16/966,930, filed as application No. PCT/JP2018/044299 on Nov. 30, 2018, now Pat. No. 11,251,032.

(30) Foreign Application Priority Data

Feb. 9, 2018  (JP) ................................. 2018-021901

(51) Int. Cl.
*H01J 49/04* (2006.01)
*G01N 27/623* (2021.01)

(52) U.S. Cl.
CPC ........ *H01J 49/0409* (2013.01); *G01N 27/623* (2021.01); *H01J 49/0418* (2013.01)

(58) Field of Classification Search
CPC .... H01J 49/0409; H01J 49/04; H01J 49/0418; G01N 27/623; G01N 27/64; G01N 1/28
See application file for complete search history.

(56) References Cited

U.S. PATENT DOCUMENTS

| | | | |
|---|---|---|---|
| 3,852,595 A | 12/1974 | Aberth | |
| 11,251,032 B2 * | 2/2022 | Kotani | ................ H01J 49/0409 |
| 2002/0094533 A1 | 7/2002 | Hess et al. | |
| 2003/0138823 A1 | 7/2003 | Brock et al. | |
| 2005/0072917 A1 | 4/2005 | Becker | |

(Continued)

FOREIGN PATENT DOCUMENTS

| | | |
|---|---|---|
| CN | 1549921 A | 11/2004 |
| CN | 101105473 A | 1/2008 |

(Continued)

OTHER PUBLICATIONS

International Preliminary Report on Patentability dated Aug. 20, 2020 for PCT/JP2018/044299.

(Continued)

*Primary Examiner* — David E Smith
(74) *Attorney, Agent, or Firm* — Faegre Drinker Biddle & Reath LLP (57) ABSTRACT

A sample support body is a sample support body for ionizing a sample, including: a substrate having an irregular porous structure formed to communicate a first surface and a second surface opposite to each other; and a conductive layer provided at least on the first surface.

5 Claims, 6 Drawing Sheets

(56) References Cited

U.S. PATENT DOCUMENTS

| | | | | |
|---|---|---|---|---|
| 2006/0266941 A1* | 11/2006 | Vestal | ................. | H01J 49/0418 |
| | | | | 250/288 |
| 2009/0095897 A1 | 4/2009 | Okuno et al. | | |
| 2009/0314936 A1 | 12/2009 | Okuno | | |
| 2010/0133098 A1 | 6/2010 | Hafeman et al. | | |
| 2010/0261159 A1* | 10/2010 | Hess | ................. | B01L 3/5025 |
| | | | | 435/7.1 |
| 2011/0123411 A1 | 5/2011 | Butler | | |
| 2015/0299761 A1 | 10/2015 | Hattan | | |
| 2017/0358436 A1* | 12/2017 | Naito | ................. | G01N 27/62 |

FOREIGN PATENT DOCUMENTS

| | | | |
|---|---|---|---|
| CN | 101473213 | A | 7/2009 |
| CN | 102762746 | A | 10/2012 |
| CN | 103620398 | A | 3/2014 |
| CN | 105466816 | A | 4/2016 |
| JP | 2009-080106 | A | 4/2009 |
| JP | 2010-078346 | A | 4/2010 |
| JP | 6093492 | B1 | 3/2017 |
| WO | WO 03/001889 | A2 | 1/2003 |

OTHER PUBLICATIONS

Gueven et al, Hydraulic Properties of Porous Sintered Glass Bead Systems, Granular Matter, 19(2), 1-21, 2017 (Year: 2017).

Nayak and Knapp, "Matrix-Free LDI Mass Spectrometry Platform Using Patterned Nanostructured Gold Thin Film", Anal. Chem, 2010, 82, 7772-7778 (Year: 2010).

Fonash Stephen J. et al, "Nanostructured Silicon for Bio-medical Applications", Proceedings of SPIE, vol. 4236, Dec. 13, 2000, XP055848700, pp. 280-285.

\* cited by examiner

SAMPLE SUPPORT

TECHNICAL FIELD

The present disclosure relates to a sample support body.

BACKGROUND ART

In the related art, a sample support body for ionizing a sample is known in mass spectrometry of a sample such as a biological sample (for example, refer to Patent Literature 1). Such a sample support body includes a substrate on which a plurality of through holes opening to a first surface and a second surface opposite to each other are formed.

CITATION LIST

Patent Literature

Patent Literature 1: Japanese Patent No. 6093492

SUMMARY OF INVENTION

Technical Problem

In the mass spectrometry as described above, the sample (a sample ion) that is ionized is detected, and the mass spectrometry of the sample is performed on the basis of a detection result thereof. In such mass spectrometry, it is desirable to improve a signal intensity (a sensitivity).

Therefore, an object of the present disclosure is to provide a sample support body in which a signal intensity of a sample ion can be improved.

Solution to Problem

A sample support body according to one aspect of the present disclosure is a sample support body for ionizing a sample, including: a substrate having an irregular porous structure formed to communicate a first surface and a second surface opposite to each other; and a conductive layer provided at least on the first surface.

In the sample support body, the substrate has an irregular porous structure formed to communicate the first surface and the second surface. Accordingly, for example, in a case where the sample support body is disposed on a sample such as a biological sample such that the second surface faces the sample, it is possible to move a component of the sample from the second surface side of the substrate towards the first surface side through the porous structure by using a capillary action. Further, for example, in a case where the first surface of the substrate is irradiated with an energy ray such as laser beam, energy is transmitted to the component of the sample that is moved to the first surface side via the conductive layer, and thus, the component of the sample can be ionized. In addition, in the sample support body, the substrate has a porous structure, and thus, the component of the sample can be moved from the second surface side to the first surface side by following a plurality of routes (flow paths) formed in the substrate. As a result thereof, it is possible to accelerate the movement of the component of the sample from the second surface side to the first surface side. Accordingly, according to the sample support body, it is possible to improve a signal intensity of a sample ion.

The substrate may be formed of a sintered body of glass beads. In this case, it is possible to suitably attain the movement of the component of the sample according to a capillary action. In addition, in this case, it is possible to obtain the substrate in which the movement of the component of the sample according to the capillary action can be attained, at a low price.

The substrate may be formed of porous glass. In this case, it is possible to suitably attain the movement of the component of the sample according to the capillary action.

The substrate may be formed of a fiber porous body. In this case, it is possible to suitably attain the movement of the component of the sample according to the capillary action.

A sample support body according to another aspect of the present disclosure is a sample support body for ionizing a sample, including: a substrate having conductivity and an irregular porous structure formed to communicate a first surface and a second surface opposite to each other.

According to the sample support body, it is possible to omit the conductive layer and to obtain the same effects as those of the sample support body including the conductive layer described above.

The substrate may be formed of a porous metal. In this case, it is possible to suitably attain the movement of the component of the sample according to the capillary action. In addition, in this case, it is possible to allow the substrate to have conductivity and to omit the conductive layer.

Advantageous Effects of Invention

According to the present disclosure, it is possible to provide a sample support body in which a signal intensity of a sample ion can be improved.

DESCRIPTION OF EMBODIMENTS

Hereinafter, preferred embodiments of the present disclosure will be described in detail, with reference to the drawings. Note that, in each of the drawings, the same reference numerals will be applied to the same portions or the corresponding portions, and the repeated description will be omitted. In addition, dimensions or dimensional ratios of each member (or part) illustrated in the drawings may be different from actual dimensions or dimensional ratios in order to make the description easy to understand.

[Configuration of Sample Support Body]

Figure 1:
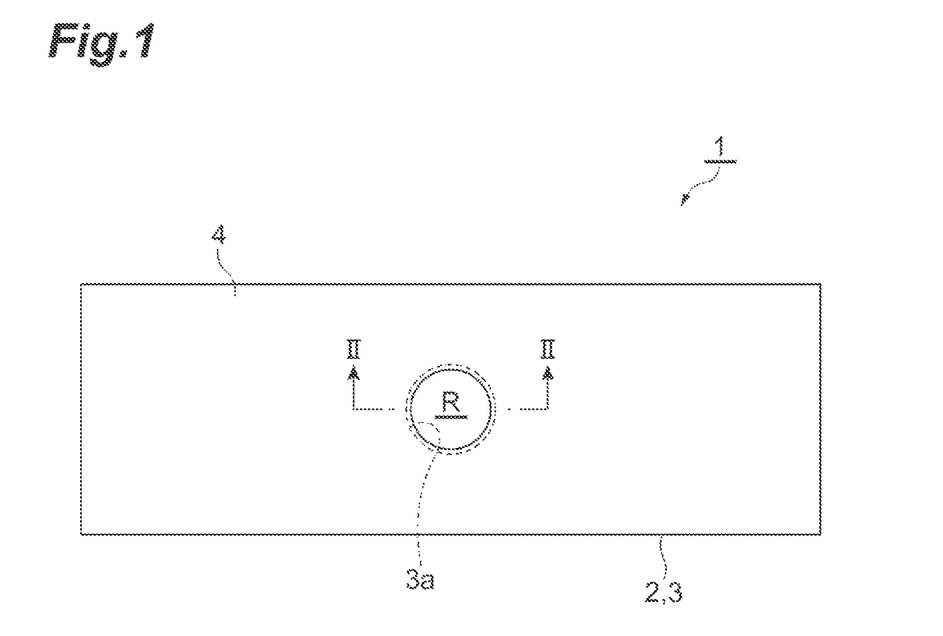
FIG. 1 is a plan view of a sample support body according to one embodiment.
Figure 2:
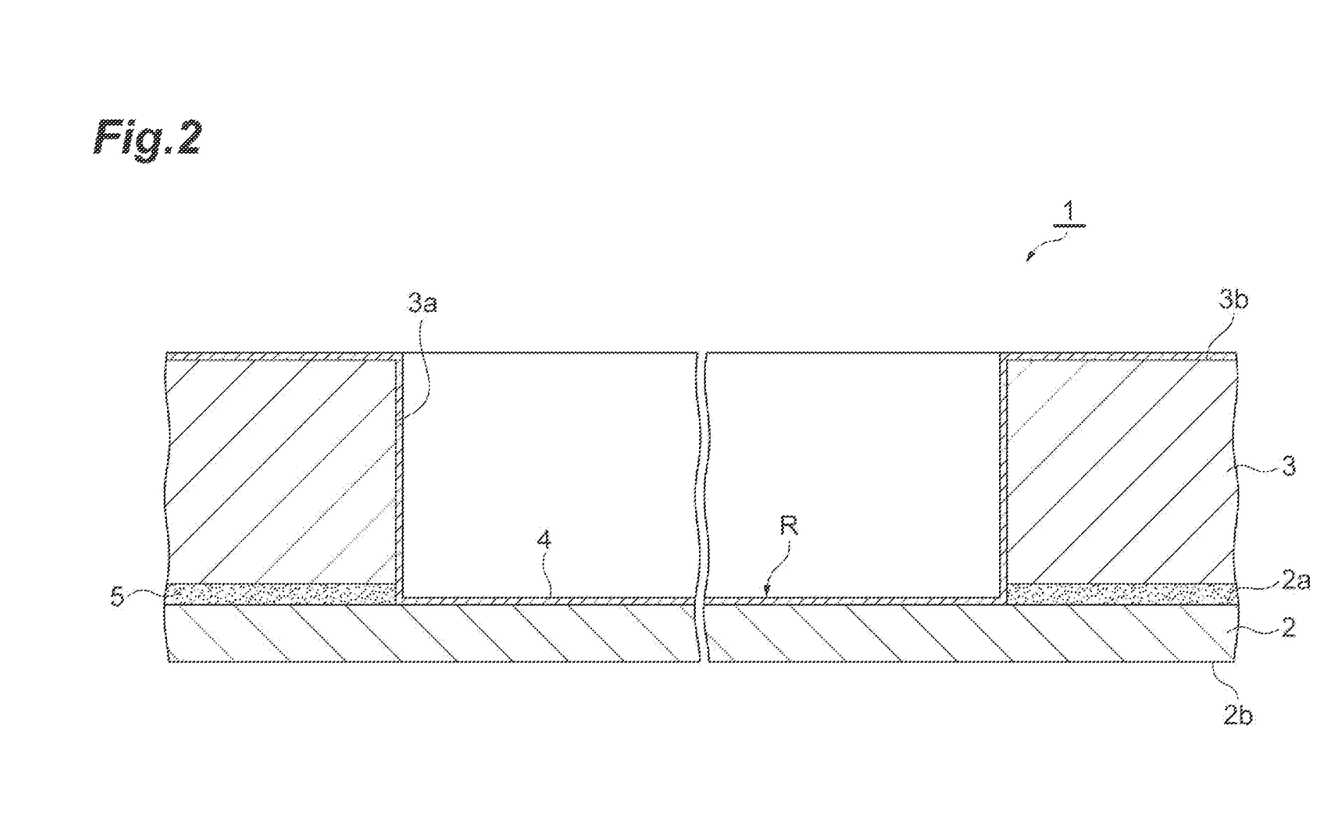
FIG. 2 is a sectional view of the sample support body along line II-II illustrated in FIG. 1.

As illustrated in FIG. 1 and FIG. 2, a sample support body 1 includes a substrate 2, a frame 3, and a conductive layer 4. The sample support body 1 is a sample support body for ionizing a sample. The sample support body 1, for example, is used for ionizing a component of a sample that is a measurement target, at the time of performing mass spectrometry. The substrate 2 includes a first surface 2a and a second surface 2b opposite to each other. The substrate 2, for example, is formed of an insulating material into the shape of a rectangular plate. The length of one side of the substrate 2 when seen from a thickness direction of the substrate 2, for example, is approximately several cm, and the thickness of the substrate 2, for example, is approximately 1 μm to 1000 μm.

The substrate 2 has an irregular porous structure formed to communicate the first surface 2a and the second surface 2b. The irregular porous structure, for example, is a structure in which gaps (fine pores) extend in an irregular direction and are irregularly distributed on a three-dimension. The irregular porous structure, for example, is a sponge-shaped structure. For example, as with a structure in which a plurality of fine pores extending along the thickness direction of the substrate 2 are provided from the first surface 2a to the second surface 2b, as main fine pores, a regular structure configured of fine pores mainly extending in one direction is not included in the irregular porous structure. For this reason, for example, a liquid in contact with the second surface 2b can be moved from the second surface 2b side towards the first surface 2a side by following a plurality of routes (flow paths) formed in the substrate 2. For example, in a case where the substrate 2 is formed of a sintered body of glass beads described below, the porosity of the porous structure, for example, is 40% to 50%.

The substrate 2, for example, is formed of the sintered body of the glass beads. The sintered body of the glass beads, for example, has a structure in which a plurality of glass beads are integrated by sintering. The glass beads are in the shape of a sphere. The shape and the size of each of the glass beads contained in the substrate 2 may be even, or may be uneven. The porous structure described above is formed by the plurality of glass beads and a plurality of gaps formed between the glass beads. The gaps between the respective glass beads are irregularly communicated with each other. An average particle diameter (diameter) of the glass beads, for example, is approximately 50 μm. The average particle diameter, for example, is a value in the case of being measured by an image analysis method or a laser diffraction scattering method.

The frame 3 is provided on the first surface 2a of the substrate 2. Specifically, the frame 3 is fixed to the first surface 2a of the substrate 2 by an adhesive layer 5. It is preferable that an adhesive material having less emitted gas (for example, glass with a low melting point, a vacuum adhesive agent, and the like) is used as the material of the adhesive layer 5. The frame 3 has approximately the same outer shape as that of the substrate 2 when seen from the thickness direction of the substrate 2. An opening 3a is formed in the frame 3. A portion corresponding to the opening 3a in the substrate 2 functions as an effective region R for moving the component of the sample described below to the first surface 2a side.

The frame 3, for example, is formed of an insulating material into the shape of a rectangular plate. The length of one side of the frame 3 when seen from the thickness direction of the substrate 2, for example, is approximately several cm, and the thickness of the frame 3, for example, is less than or equal to 1 mm. The opening 3a, for example, is in the shape of a circle when seen from the thickness direction of the substrate 2, and in such a case, the diameter of the opening 3a, for example, approximately several mm to several tens of mm According to such a frame 3, the handling of the sample support body 1 is facilitated, and the deformation of the substrate 2 due to a temperature change or the like is suppressed. Note that, in a case where the thickness of the substrate 2 is sufficient (for example, greater than or equal to 500 μm), the frame 3 may be omitted.

The conductive layer 4 is provided on the first surface 2a of the substrate 2. Specifically, the conductive layer 4 is continuously (integrally) formed in a region corresponding to the opening 3a of the frame 3 in the first surface 2a of the substrate 2 (that is, a region corresponding to the effective region R), the inner surface of the opening 3a, and a surface 3b of the frame 3 on a side opposite to the substrate 2. In the effective region R, the conductive layer 4 is provided on a peripheral portion of the gaps (fine pores) in the first surface 2a of the substrate 2. That is, in the effective region R, the conductive layer 4 covers a portion of the first surface 2a of the substrate 2 on which the gaps are not formed (in this embodiment, the surface of the glass beads that is exposed to the first surface 2a side). In other words, the conductive layer 4 is provided on the first surface 2a not to block an opening (entrance) of the plurality of routes formed in the substrate 2 on the first surface 2a side. That is, in the effective region R, the opening of the plurality of routes formed in the substrate 2 on the first surface 2a side is exposed to the opening 3a.

The conductive layer 4 is formed of a conductive material. Here, it is preferable that a metal having low affinity (reactivity) with respect to a sample and high conductivity is used as the material of the conductive layer 4, from the following reasons.

For example, in a case where the conductive layer 4 is formed of a metal such as copper (Cu) having high affinity with respect to a sample such as protein, in a process of ionizing the sample described below, the sample is ionized in a state where Cu atoms are attached to sample molecules, and thus, there is a concern that a detection result is shifted in a mass spectrometry method described below as the Cu atoms are attached. Therefore, it is preferable that a metal having low affinity with respect to the sample is used as the material of the conductive layer 4.

On the other hand, a metal having high conductivity easily and stably applies a constant voltage. For this reason, in a case where the conductive layer 4 is formed of the metal having high conductivity, it is possible to homogeneously apply a voltage to the first surface 2a of the substrate 2 in the effective region R. In addition, there is a tendency that the metal having high conductivity also has high thermal conductivity. For this reason, in a case where the conductive layer 4 is formed of the metal having high conductivity, it is possible to efficiently transfer the energy of laser beam that is applied to the substrate 2 to the sample via the conductive layer 4. Therefore, it is preferable that the metal having high conductivity is used as the material of the conductive layer 4.

From the viewpoint described above, it is preferable that gold (Au), platinum (Pt), and the like are used as the material of the conductive layer 4. The conductive layer 4, for example, is formed to have a thickness of approximately 1 nm to 350 nm by a plating method, an atomic layer deposition (ALD) method, a vapor deposition method, a sputtering method, and the like. Note that, chromium (Cr), nickel (Ni), titanium (Ti), and the like may be used as the material of the conductive layer 4.

[Method for Ionizing Sample]

Figure 3:
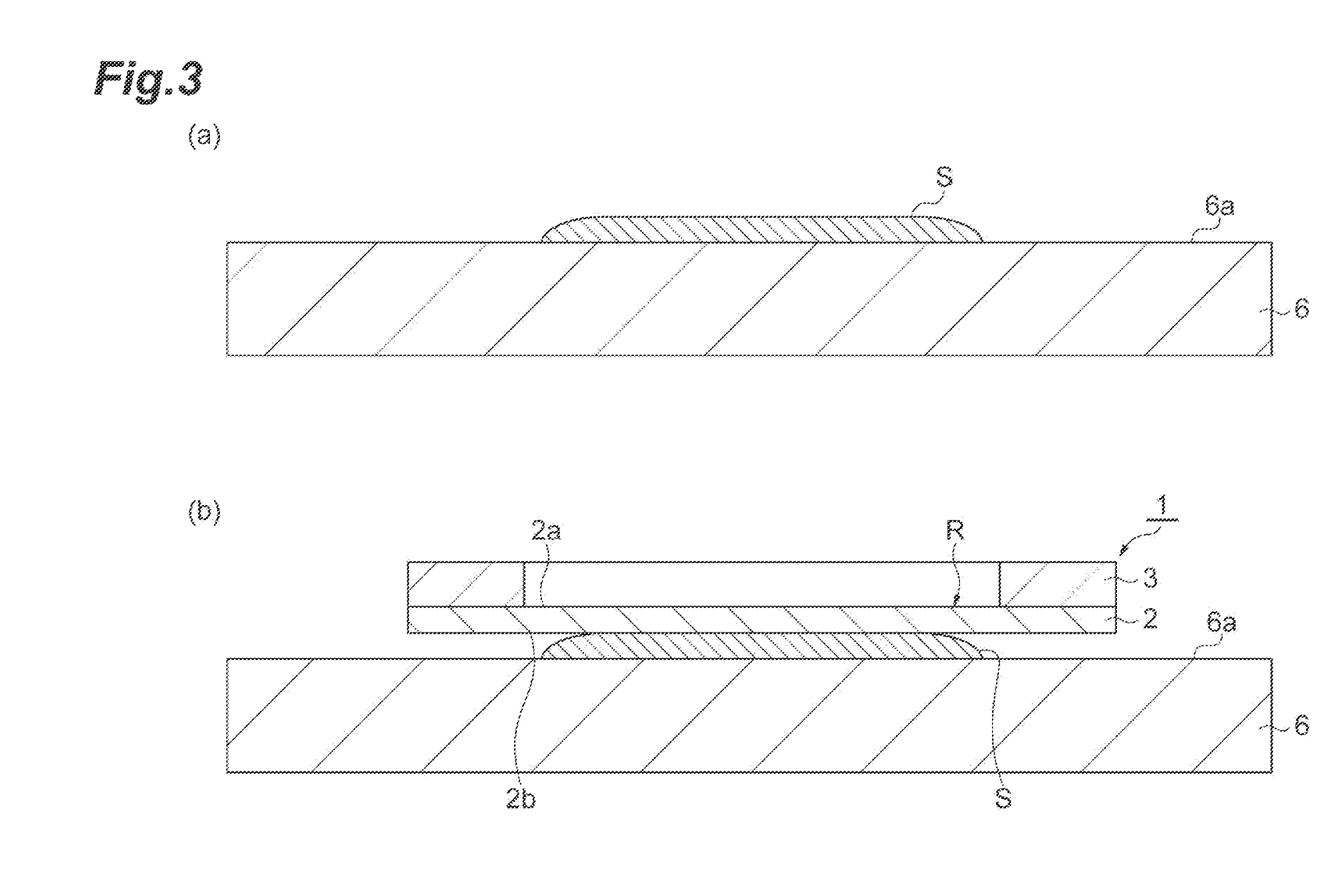
FIG. 3 is a diagram illustrating a procedure of a mass spectrometry method according to one embodiment.
Figure 4:
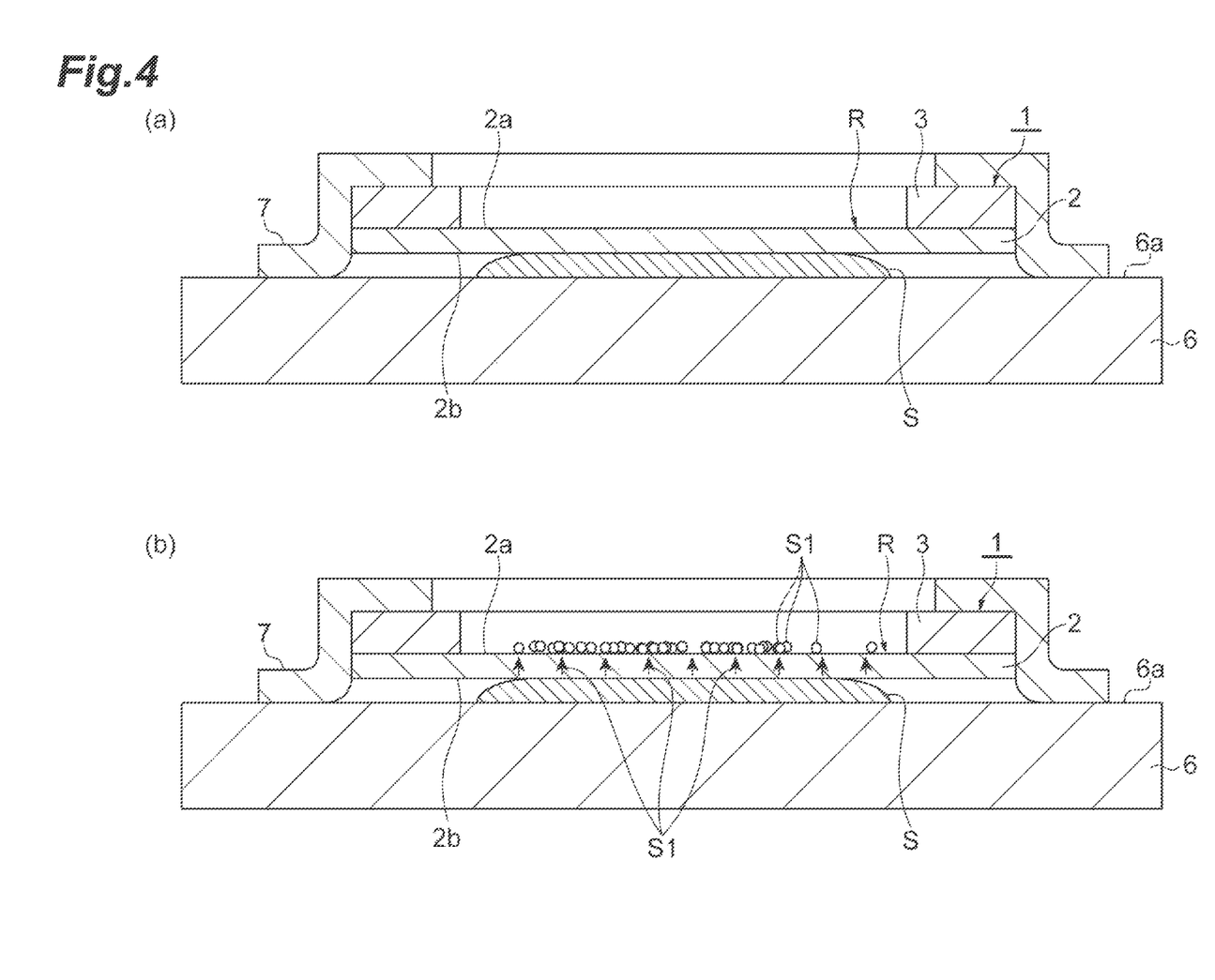
FIG. 4 is a diagram illustrating a procedure of a mass spectrometry method according to one embodiment.
Figure 5:
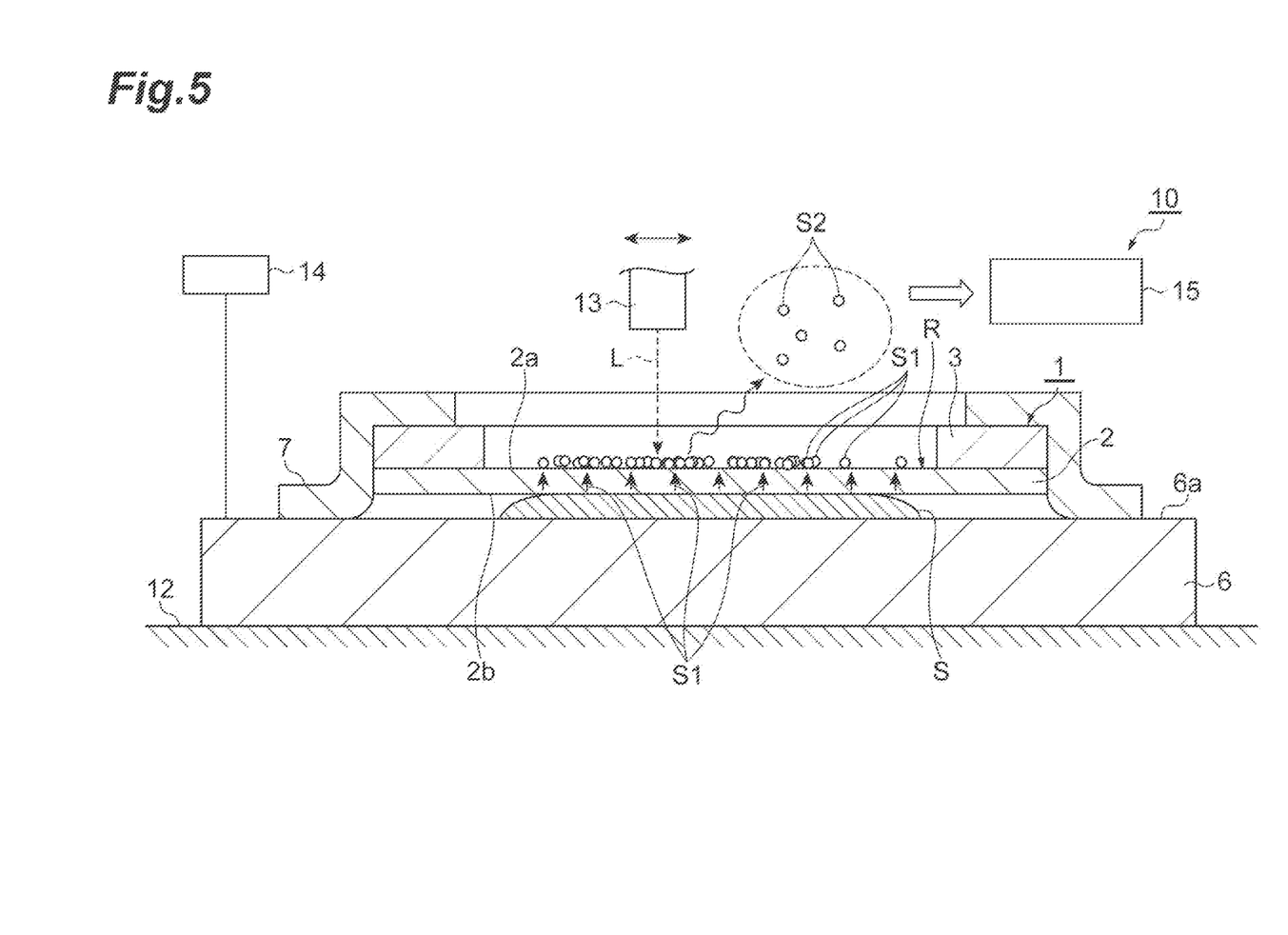
FIG. 5 is a diagram illustrating a procedure of a mass spectrometry method according to one embodiment.

Next, a method for ionizing a sample, using the sample support body 1, will be described with reference to FIG. 3 to FIG. 5. Here, as an example, a laser desorption/ionization method (a part of a mass spectrometry method of a mass spectrometry device 10) using laser beam (an energy ray) will be described. In FIG. 3 to FIG. 5, the fine pores, the conductive layer 4, and the adhesive layer 5 in the sample support body 1 are not illustrated. In addition, the sample support body 1 illustrated in FIG. 1 and FIG. 2 and the sample support body 1 illustrated in FIG. 3 to FIG. 5 have different dimensional ratios or the like, for convenience of illustration.

First, the sample support body 1 described above is prepared. The sample support body 1 may be prepared by being manufactured by a person who carries out an ionization method and the mass spectrometry method, or may be prepared by being acquired from a manufacturer, a seller, or the like of the sample support body 1.

Subsequently, as illustrated in (a) of FIG. 3, a sample S that is a mass spectrometry target is mounted on a mounting surface 6a of a glass slide (a mounting portion) 6. The glass slide 6 is a glass substrate on which a transparent conductive film such as an indium tin oxide (ITO) film is formed, and the surface of the transparent conductive film is the mounting surface 6a. Note that, not only the glass slide 6 but also a member that is capable of ensuring conductivity (for example, a substrate of a metal material such as stainless steel, or the like) can be used as the mounting portion.

Subsequently, as illustrated in (b) of FIG. 3, the sample support body 1 is disposed on the sample S such that the second surface 2b is in contact with the sample S. At this time, the sample S is disposed in the effective region R when seen from the thickness direction of the substrate 2. Here, the sample S, for example, is a biological sample (a hydrous sample). In order to smoothly move a component S1 of the sample S (refer to FIG. 4), a solution (for example, an acetonitrile mixed liquid, acetone, or the like) for decreasing the viscosity of the component S1 may be added to the sample S.

Subsequently, as illustrated in (a) of FIG. 4, in a state where the second surface 2b of the substrate 2 is brought into contact with the sample S, the sample support body 1 is fixed to the glass slide 6. The sample support body 1 is fixed to the glass slide 6 by a tape 7 (for example, a carbon tape or the like) having conductivity. Specifically, the tape 7 is in contact with the surface of the conductive layer 4 that is formed on the surface 3b of the frame 3 and is in contact with the mounting surface 6a of the glass slide 6, and thus, the sample support body 1 is fixed to the glass slide 6. The tape 7 may be a part of the sample support body 1, or may be prepared separately from the sample support body 1. In a case where the tape 7 is a part of the sample support body 1 (that is, in a case where the sample support body 1 includes the tape 7), for example, the tape 7 may be fixed in advance to the surface 3b side in a peripheral portion of the frame 3. More specifically, the tape 7 may be fixed onto the conductive layer 4 in the peripheral portion of the frame 3.

As illustrated in (b) of FIG. 4, the component S1 of the sample S is moved to from the second surface 2b side of the sample support body 1 towards the first surface 2a side through the plurality of routes formed in the substrate 2, in accordance with a capillary action. The component S1 that is moved to the first surface 2a side of the substrate 2 is remained on the first surface 2a side by a surface tension.

Subsequently, as illustrated in FIG. 5, in a state where the sample S is disposed between the glass slide 6 and the sample support body 1, the glass slide 6, the sample support body 1, and the sample S are mounted on a support portion 12 (for example, a stage) of the mass spectrometry device 10. Subsequently, a voltage is applied to the conductive layer 4 of the sample support body 1 (refer to FIG. 2) via the mounting surface 6a of the glass slide 6 and the tape 7 by a voltage application unit 14 of the mass spectrometry device 10.

Subsequently, the first surface 2a of the substrate 2 is irradiated with the laser beam L through the opening 3a of the frame 3 by a laser beam irradiation unit 13 of the mass spectrometry device 10. That is, the laser beam L is applied to a region corresponding to the opening 3a of the frame 3 in the first surface 2a of the substrate 2 (that is, a region corresponding to the effective region R). Here, the laser beam irradiation unit 13 scans the region corresponding to the effective region R with the laser beam L. Note that, the scanning of the laser beam L with respect to the region corresponding to the effective region R can be performed by operating at least one of the support portion 12 and the laser beam irradiation unit 13.

As described above, the first surface 2a of the substrate 2 is irradiated with the laser beam L while a voltage is applied to the conductive layer 4, and thus, the component S1 that is moved to the first surface 2a side of the substrate 2 is ionized, and a sample ion S2 (the component S1 that is ionized) is emitted. Specifically, energy is transmitted from the conductive layer 4 (refer to FIG. 2) absorbing the energy of the laser beam L to the component S1 that is moved to the first surface 2a side of the substrate 2, and the component S1 obtaining the energy is gasified and obtains a charge, and thus, the sample ion S2 is obtained. Each of the steps described above corresponds to the method for ionizing the sample S, using the sample support body 1 (here, as an example, a laser desorption/ionization method as a part of the mass spectrometry method).

The sample ion S2 that is emitted is moved towards a ground electrode (not illustrated) that is provided between the sample support body 1 and an ion detection unit 15 while being accelerated. That is, the sample ion S2 is moved towards the ground electrode while being accelerated by a potential difference that occurs between the conductive layer 4 to which a voltage is applied and the ground electrode. Then, the sample ion S2 is detected by the ion detection unit 15 of the mass spectrometry device 10. Here, the ion detection unit 15 detects the sample ion S2 to correspond to a scanning position of the laser beam L. Note that, here, the mass spectrometry device 10 is a mass spectrometry device using a time-of-flight mass spectrometry (TOF-MS) method. Each of the steps described above corresponds to the mass spectrometry method using the sample support body 1.

As described above, in the sample support body 1, the substrate 2 has an irregular porous structure formed to communicate the first surface 2a and the second surface 2b. Accordingly, for example, in a case where the sample support body 1 is disposed on the sample S such as a biological sample such that the second surface 2b faces the sample S, it is possible to move the component S1 of the sample S from the second surface 2b side of the substrate 2 towards the first surface 2a side through the porous structure by using a capillary action. Further, for example, in a case where the first surface 2a of the substrate 2 is irradiated with the laser beam L, energy is transmitted to the component S1 of the sample S that is moved to the first surface 2a side via the conductive layer 4, and thus, the component S1 of the sample S can be ionized. In addition, in the sample support body 1, the substrate 2 has a porous structure, and thus, it is possible to move the component S1 of the sample S from the second surface 2b side to the first surface 2a side by following the plurality of routes formed in the substrate 2. As a result thereof, it is possible to accelerate the movement of the component S1 of the sample S from the second surface 2b side to the first surface 2a side. Accordingly, according to the sample support body 1, it is possible to improve a signal intensity of the sample ion S2.

The substrate 2 is formed of the sintered body of the glass beads. According to such a configuration, it is possible to suitably attain the movement of the component S1 of the sample S according to the capillary action. In addition, it is possible to obtain the substrate 2 in which the movement of the component S1 of the sample S according to the capillary action can be attained, at a low price. Further, in the mass spectrometry, it is possible to improve a background noise in a low-mass region.

Figure 6:
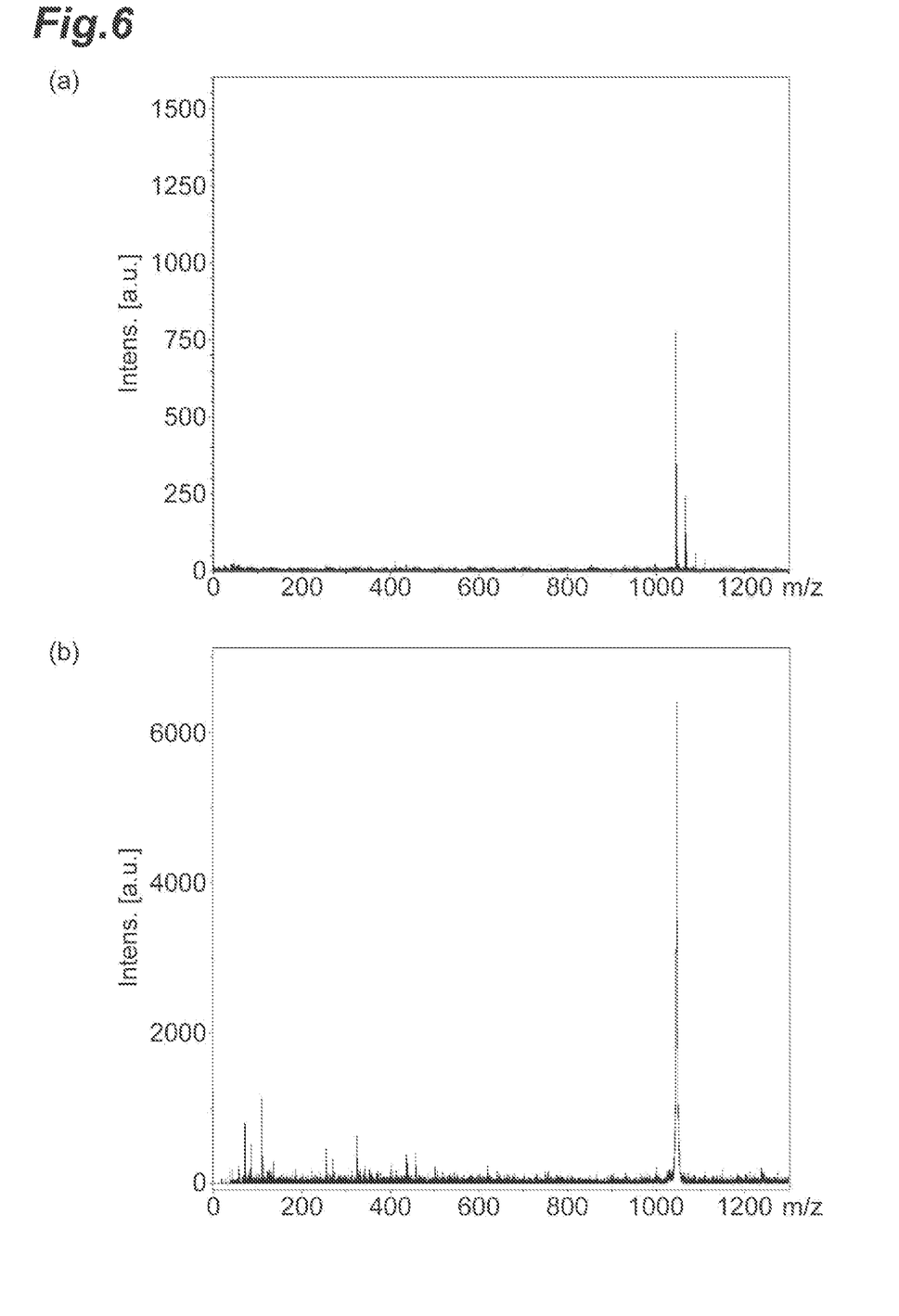
FIG. 6 is a diagram illustrating results of a mass spectrometry method according to an example and a comparative example.

FIG. 6 is a diagram illustrating results of a mass spectrometry method of an example and a comparative example. In the example and the comparative example, a mass spectrum of Angiotensin II was measured by using a solution (a mixed sample) in which 0.2 M of diammonium citrate (DHC) and 0.2 M of a citric acid (CitAc) were mixed to Angiotensin II at approximately m/z=1046.5 in equal amount.

Specifically, in the example, first, the mixed sample was dropped onto the mounting surface 6a of the glass slide 6, and the sample support body 1 was disposed on the mixed sample such that the second surface 2b was in contact with the mixed sample (refer to FIG. 3). Note that, the thickness of the conductive layer 4 (refer to FIG. 2) of the sample support body 1, used in the example, is approximately 800 Å. Subsequently, in a state where the second surface 2b of the substrate 2 was brought into contact with the mixed sample, the sample support body 1 was fixed to the glass slide 6. Accordingly, the component of the mixed sample was moved from the second surface 2b side of the sample support body 1 towards the first surface 2a side through the plurality of routes formed in the substrate 2, in accordance with a capillary action.

Subsequently, in a state where the sample support body 1 and the mixed sample were disposed on the glass slide 6, the glass slide 6, the sample support body 1, and the mixed sample were mounted on the support portion 12 (for example, the stage) of the mass spectrometry device 10. Subsequently, a voltage was applied to the conductive layer 4 of the sample support body 1, and the first surface 2a of the substrate 2 is irradiated with the laser beam L, and thus, the component of the mixed sample was ionized, and then, the sample ion was detected (refer to FIG. 5).

In the comparative example, the measurement was performed in the same procedure as that of the example described above, by using a sample support body including a substrate having a regular structure configured of a plurality of fine pores mainly extending in one direction (a thickness direction of the substrate) (for example, refer to a sample support body 2 described in Patent Literature 1), instead of the sample support body 1.

(a) of FIG. 6 illustrates measurement results of the example, and (b) of FIG. 6 illustrates measurement results of the comparative example. As illustrated in (a) and (b) of FIG. 6 6, in the mass spectrometry, in the case of using the sample support body 1, a signal intensity corresponding to the sample (Angiotensin II) decreased, but a signal corresponding to the sample was capable of being suitably detected, compared to the case of using the sample support body of the comparative example. Further, in the case of using the sample support body 1, an effect was checked in which a background noise in a low-mass region was dramatically reduced, compared to the case of using the sample support body of the comparative example.

Modification Example

As described above, the embodiments of the present disclosure have been described, but the present disclosure is not limited to the embodiments described above, and the present disclosure can be variously modified within a range not departing from the gist thereof.

The substrate 2 may be formed of porous glass. The porous glass is a sponge-shaped glass plate on which a plurality of fine pores are irregularly formed and connected. The size of the fine pore (an average pore diameter), for example, is approximately 1.45 nm. The porosity of the porous glass, for example is approximately 56%. The substrate 2 may be formed of porous ceramic. The structure of the porous ceramic is the same as that of the porous glass.

The substrate 2 may be formed of a fiber porous body. The fiber porous body has a structure in which a plurality of linear cellulose nanofibers overlap with each other (an aggregate). The fiber porous body, for example, may have a structure in which a plurality of carbon nanofibers, a plurality of fibrous porous silicas, or a plurality of glass fibers (or in an arbitrary combination) overlap with each other, respectively.

In a case where the substrate 2 is as described above, it is possible to suitably attain the movement of the component S1 of the sample S according to the capillary action.

The substrate 2 may have conductivity, and in the mass spectrometry method, a voltage may be applied to the substrate 2. Specifically, the substrate 2 may be formed of a porous metal. The porous metal is a sponge-shaped metal porous body (also referred to as a metal porous body, a foamed metal, a porous metal, a porous metal, a porous metal, and the like) on which a plurality of fine pores are irregularly formed and connected. The porous metal, for example, is manufactured by sintering a mixed body of a metal fine powder and spacer particles, and then, by removing the spacer particles. The porosity of the porous metal, for example, is 84% to 93%. The material of the porous metal, for example, is titanium (Ti), aluminum (Al), and the like. In addition, the porous metal can be manufactured by integrating a powder formed of a plurality of metals with sintering. Examples of such a powder include a bronze spherical powder, a stainless steel (SUS) spherical powder, a SUS irregular powder, and the like.

In a case where the substrate 2 has conductivity, it is possible to omit the conductive layer 4 from the sample support body 1 and to obtain the same effects as those of the case of using the sample support body 1 including the conductive layer 4 described above. In addition, even in a case where the substrate 2 is a porous metal, it is possible to suitably attain the movement of the component S1 of the sample S according to the capillary action. Note that, even in a case where the substrate 2 has conductivity, the conductive layer 4 may be provided on the first surface 2a of the substrate 2.

It is sufficient that the irregular porous structure described above is provided at least in the region corresponding to the effective region R in the substrate 2, and the irregular porous structure may not be necessarily provided over the entire substrate 2.

In addition, the application of the sample support body 1 is not limited to the ionization of the sample S by the irradiation of the laser beam L. The sample support body 1 may be used in the ionization of the sample S by the irradiation of the energy ray other than the laser beam L (for example, an ion beam, an electron beam, and the like).

The conductive layer 4 may be not provided on the second surface 2b of the substrate 2 and the inner surface of the fine pore formed in the substrate 2, or may be provided on the second surface 2b of the substrate 2 and the inner surface of the fine pore. That is, it is sufficient that the conductive layer 4 is provided at least on the first surface 2a of the substrate 2.

The sample support body 1 may be fixed to the glass slide 6 by means other than the tape 7 (for example, means using an adhesive agent, a fixing tool, or the like). In addition, in the mass spectrometry method, a voltage may be applied to the conductive layer 4 without using the mounting surface 6a of the glass slide 6 and the tape 7. In this case, the glass slide 6 and the tape 7 may not have conductivity.

The method for ionizing a sample described above can be used not only in the mass spectrometry of the molecules configuring the sample S, but also in other measurements and tests such as ion mobility measurement.

The opening 3a of the frame 3 may have various shapes when seen from the thickness direction of the substrate 2. The shape of the opening 3a of the frame 3, for example, may be a rectangular shape.

The sample S may be a dry sample. In this case, in order to move the component S1 of the sample S from the second surface 2b side of the substrate 2 to the first surface 2a side by a capillary action, for example, a solvent (for example, an acetonitrile mixed liquid, acetone, or the like) may be added to the sample S.

In the mass spectrometry method, the sample S may be directly mounted on the support portion 12 of the mass spectrometry device 10. At this time, the support portion 12 of the mass spectrometry device 10 corresponds to the glass slide 6.

REFERENCE SIGNS LIST

1: sample support body, 2: substrate, 2a: first surface, 2b: second surface, 4: conductive layer, S: sample.

The invention claimed is:

1. A sample support body for ionizing a sample, comprising:
a substrate having an irregular porous structure formed to communicate a first surface and a second surface opposite to each other; and
a conductive layer provided at least on the first surface,
wherein the substrate is formed of a sintered body of glass beads,
wherein an average particle diameter of the glass beads is approximately 50 µm.

2. The sample support body according to claim 1,
wherein the porosity of the porous structure is 40% to 50%.

3. The sample support body according to claim 1,
wherein the thickness of the substrate is 1 µm to 1000 µm.

4. A sample support body for ionizing a sample, comprising:
a substrate having an irregular porous structure formed to communicate a first surface and a second surface opposite to each other; and
a conductive layer provided at least on the first surface,
wherein the substrate is formed of a sintered body of glass beads,
wherein the porosity of the porous structure is 40% to 50%.

5. The sample support body according to claim 4,
wherein the thickness of the substrate is 1 µm to 1000 µm.

* * * * *